United States Patent
Lee et al.

(10) Patent No.: US 11,777,091 B2
(45) Date of Patent: Oct. 3, 2023

(54) CATHODE SLURRY COMPOSITION, CATHODE MANUFACTURED USING SAME, AND BATTERY INCLUDING SAME

(71) Applicant: LG CHEM, LTD., Seoul (KR)

(72) Inventors: Jaegil Lee, Daejeon (KR); Doo Kyung Yang, Daejeon (KR); Yu Mi Kim, Daejeon (KR); Yun Kyoung Kim, Daejeon (KR); Eunkyung Cho, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 232 days.

(21) Appl. No.: 16/958,599

(22) PCT Filed: Jan. 11, 2019

(86) PCT No.: PCT/KR2019/000442
§ 371 (c)(1),
(2) Date: Jun. 26, 2020

(87) PCT Pub. No.: WO2019/139397
PCT Pub. Date: Jul. 18, 2019

(65) Prior Publication Data
US 2021/0167385 A1    Jun. 3, 2021

(30) Foreign Application Priority Data

Jan. 11, 2018  (KR) .................. 10-2018-0003656
Jan. 11, 2019  (KR) .................. 10-2019-0003703

(51) Int. Cl.
*H01M 4/583*        (2010.01)
*H01M 4/04*         (2006.01)
(Continued)

(52) U.S. Cl.
CPC ......... *H01M 4/583* (2013.01); *H01M 4/0404* (2013.01); *H01M 4/362* (2013.01);
(Continued)

(58) Field of Classification Search
CPC .......... Y02E 60/10; Y02P 70/50; Y02T 10/70; H01M 4/583; H01M 4/0404; H01M 4/362; H01M 4/382; H01M 2004/028
See application file for complete search history.

(56) References Cited

U.S. PATENT DOCUMENTS

2004/0234851 A1    11/2004  Kim et al.
2013/0164635 A1*    6/2013  Schmidt ............... H01M 4/133
                                                              252/502

(Continued)

FOREIGN PATENT DOCUMENTS

CN    104870241 A    8/2015
GB     2533672 A     6/2016
(Continued)

OTHER PUBLICATIONS

International Search Report issued in PCT/KR2019/000442 (PCT/ISA/210), dated Apr. 17, 2019.
(Continued)

*Primary Examiner* — William E McClain
*Assistant Examiner* — Jason Barton
(74) *Attorney, Agent, or Firm* — Birch, Stewart, Kolasch & Birch, LLP

(57) ABSTRACT

A positive electrode slurry composition, a positive electrode manufactured using the same, and a battery including the positive electrode. The positive electrode slurry composition includes a positive electrode active material, a binder, an alcohol, and water, wherein a content of the alcohol is in a range of 0.1 to 10% by weight, based on a total weight of the composition. The slurry composition for manufacturing a (Continued)

positive electrode has effects of highly improving the dispersibility of the positive electrode active material and the conductive material, decreasing the surface roughness of an electrode, and remarkably reducing a curling phenomenon in the electrode. Also, the slurry composition has an economic advantage in that a dispersing agent is not used or an amount of the dispersing agent used can be remarkably reduced.

3 Claims, 1 Drawing Sheet

(51) Int. Cl.
   *H01M 4/36* (2006.01)
   *H01M 4/38* (2006.01)
   *H01M 4/02* (2006.01)
(52) U.S. Cl.
   CPC ...... *H01M 4/382* (2013.01); *H01M 2004/027* (2013.01); *H01M 2004/028* (2013.01)

(56) References Cited

U.S. PATENT DOCUMENTS

| | | | | |
|---|---|---|---|---|
| 2014/0186694 A1* | 7/2014 | Jiang | ................... | H01M 4/0404 429/188 |
| 2015/0318539 A1 | 11/2015 | Kelley et al. | | |
| 2016/0293955 A1* | 10/2016 | Hochi | ................... | H01M 4/364 |
| 2017/0207441 A1 | 7/2017 | Shan et al. | | |
| 2017/0352909 A1* | 12/2017 | Ainsworth | .......... | H01M 4/0404 |

FOREIGN PATENT DOCUMENTS

| | | |
|---|---|---|
| JP | 2001-176516 A | 6/2001 |
| JP | 2004-349283 A | 12/2004 |
| JP | 2015-503189 A | 1/2015 |
| JP | 2015-115194 A | 6/2015 |
| KR | 10-2005-008777 A | 9/2005 |
| KR | 10-1392800 B1 | 5/2014 |
| KR | 10-2015-0025665 A | 3/2015 |
| KR | 10-2015-0037071 A | 4/2015 |
| KR | 10-2016-0146737 A | 4/2015 |
| KR | 10-2017-0075969 A | 7/2017 |
| KR | 10-2017-0081840 A | 7/2017 |
| KR | 10-2017-0084478 A | 7/2017 |
| WO | WO 2013/074772 A1 | 5/2013 |
| WO | WO 2013/136223 A1 | 9/2013 |
| WO | WO 2015/166777 A1 | 11/2015 |
| WO | WO 2017/124859 A1 | 7/2017 |

OTHER PUBLICATIONS

Extended European Search Report for European Application No. 19739062.8, dated Jan. 21, 2021.

* cited by examiner

| | Electrode of Comparative Example 4 | Electrode of Comparative Example 5 | Electrode of Example 5 | Electrode of Example 6 | Electrode of Example 7 | Electrode of Example 8 |
|---|---|---|---|---|---|---|
| Images of Elect-rodes after Drying | 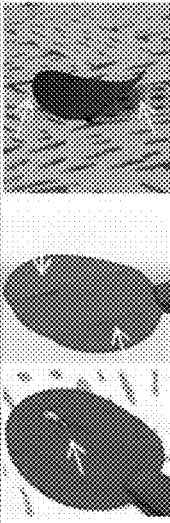 | 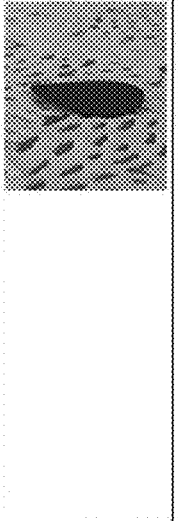 | 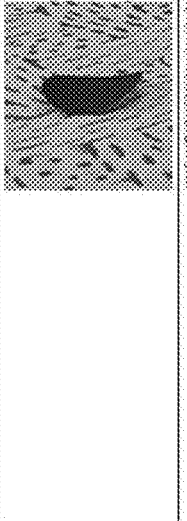 |  | 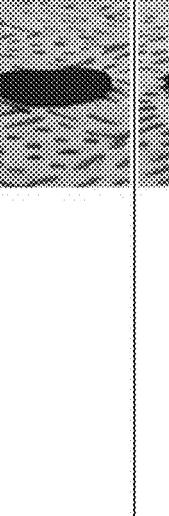 | 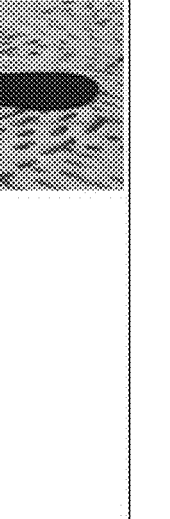 |

CATHODE SLURRY COMPOSITION, CATHODE MANUFACTURED USING SAME, AND BATTERY INCLUDING SAME

TECHNICAL FIELD

This application claims priority to Korean Patent Application No. 10-2018-0003656 filed on Jan. 11, 2018 and Korean Patent Application No. 10-2019-0003703 filed on Jan. 11, 2019 in the Korean Intellectual Property Office (KIPO), the entire contents of which are hereby incorporated by reference.

The present invention relates to a positive electrode slurry composition, a positive electrode manufactured using the same, and a battery including the positive electrode.

BACKGROUND ART

As the applied fields of energy storage technology not only expend to mobile phones, tablet and laptop computers, and camcorders but also to electric vehicles (EVs) and hybrid electric vehicles (HEVs), there is an increase demand for research and development of electrochemical devices for energy storage.

In particular, attention has been paid to the development of secondary batteries such as chargeable/dischargeable lithium-sulfur batteries, and the like. In recent years, research and development in designing novel electrodes and batteries has been actively carried out to improve capacity density and specific energy of the secondary batteries.

Because lithium-sulfur (Li—S) batteries have high energy density, the Li—S batteries have come into the spotlight as next-generation secondary batteries capable of replacing lithium ion batteries. In general, a lithium-sulfur battery has a structure in which a lithium electrolyte is impregnated into an electrode assembly, which includes a positive electrode including a sulfur-carbon composite as an electrode active material, a negative electrode including a lithium metal or a lithium alloy, and a separator.

The positive electrode of such a lithium-sulfur battery is generally manufactured by coating a metal foil with positive electrode slurry. In this case, the positive electrode slurry is prepared by mixing an electrode formulation, which includes a positive electrode active material configured to store energy, a conductive material configured to give electrical conductivity, and a binder (PVdF) configured to attach them to an electrode foil, in a solvent such as water and N-methyl pyrrolidone (NMP).

In the positive electrode slurry, the dispersibility of the positive electrode active material and/or the conductive material has an important influence on the processability in manufacturing electrodes and the characteristics of the electrodes formed thereby. Therefore, a wide verity of methods has been studied to improve the dispersibility of the positive electrode active material and/or the conductive material in the positive electrode slurry.

For example, Korean Patent Publication No. 10-2015-0025665 discloses "Positive electrode slurry for secondary batteries, characterized by including a positive electrode active material, a conductive material, a binder, a dispersing agent, and an aqueous solvent, wherein the dispersing agent is a copolymer including a main chain having ionic characteristics and side chains having non-ionic surfactant characteristics."

However, as disclosed in the patent document, when an additional dispersing agent is used, a process of manufacturing an electrode is complicated, and an increase in manufacturing costs of the electrode is caused, which is not desirable in terms of economics.

Therefore, there is a need for research on methods capable of improving the dispersibility of the positive electrode active material and/or the conductive material without using any additional dispersing agent.

PRIOR-ART DOCUMENT

Patent Document

Korean Patent Publication No. 10-2015-0025665

DISCLOSURE

Technical Problem

The present invention is designed to solve the problems of the prior art, and therefore it is an object of the present invention to provide a slurry composition for manufacturing a positive electrode, which is capable of highly improving the dispersibility of a positive electrode active material and a conductive material, decreasing the surface roughness of an electrode, and remarkably reducing a curling phenomenon in the electrode.

It is another object of the present invention to provide a slurry composition for manufacturing a positive electrode, which exhibits excellent dispersibility without using any additional dispersing agent, reduces a curling phenomenon in the electrode and has advantages in a process of manufacturing a battery.

It is still another object of the present invention to provide a positive electrode of the battery manufactured using the slurry composition for manufacturing a positive electrode, and a battery including the positive electrode.

Technical Solution

To solve the above problems, according to one aspect of the present invention, there is provided a positive electrode slurry composition including a positive electrode active material, a binder, an alcohol, and water, wherein a content of the alcohol is in a range of 0.1 to 10% by weight, based on the total weight of the composition.

According to another aspect of the present invention, there is provided a positive electrode manufactured by coating a current collector with the positive electrode slurry composition of the present invention.

According to still another aspect of the present invention, there is provided a battery, which includes:
  the positive electrode of the present invention;
  a negative electrode including a lithium metal or a lithium alloy as a negative electrode active material;
  a separator provided between the positive electrode and the negative electrode; and
  an electrolyte.

Advantageous Effects

The slurry composition for manufacturing a positive electrode according to the present invention has effects of highly improving the dispersibility of a positive electrode active material and a conductive material, decreasing the surface roughness of an electrode, and remarkably reducing a curling phenomenon in the electrode. Also, the slurry composition of the present invention has an economic advantage in that a dispersing agent is not used or an amount of the dispersing agent used can be remarkably reduced.

The battery including the positive electrode manufactured using the slurry composition for manufacturing a positive electrode has an effect of highly improving capacity, lifespan characteristics, and economic feasibility.

DESCRIPTION OF DRAWINGS

The FIGURE is an image obtained by taking pictures of a curled state of electrodes manufactured in Examples 5 to 8 and Comparative Examples 4 and 5, as observed in Experimental Example 1.

BEST MODE

Hereinafter, the present invention will be described in further detail.

The present invention relates to a positive electrode slurry composition including a positive electrode active material, a binder, an alcohol, and water, characterized in that a content of the alcohol is in a range of 0.1 to 10% by weight, based on the total weight of the composition.

The present inventors have paid attention to the fact that a positive electrode active material and a conductive material of a battery are not easily mixed with a strongly polar binder or water in aqueous slurry. That is, because very weakly polar materials are used as the positive electrode active material and the conductive material, the very weakly polar materials are not easily mixed with a strongly polar binder or water in the aqueous slurry. Therefore, the present invention is characterized by offering solutions to the above problems. That is, the present invention has a technical characteristic in that an alcohol solvent having an amphipathic property is added to improve the dispersibility of carbon and sulfur particles exhibiting weak polarity. Because the alcohol solvent is evaporated during a drying process so that it does not remain in an electrode, there is no increase in weight of the electrode. Also, because the alcohol solvent does not increase the resistance, there is no decrease in energy density of the electrode.

Aqueous C1 to C5 alcohol solutions may be used as the aqueous alcohol solution. Alcohols having a very high vapor pressure have a drawback in that a content of solids in slurry may be reduced during slurry preparation because the alcohols have a rapid evaporation rate. Also, alcohols having a very low vapor pressure have a drawback in that it is required to increase a drying temperature or extend a drying time because the alcohols have a slow drying rate. Among the aqueous C1 to C5 alcohol solution, an aqueous propanol solution may be more preferably used. This is because the aqueous propanol solution has a vapor pressure similar to water in a temperature range of 20 to 80° C. at which the slurry is prepared and the electrode is dried, and thereby it has low probabilities of reducing a dispersion effect through evaporation of alcohol during the slurry preparation and causing a change in content of solid in the slurry, and is applicable to a conventional process of drying an electrode without significant change. The propanol aqueous solution includes an aqueous 1-propanol solution.

In the present invention, the alcohol may be included at 0.1 to 10% by weight, more preferably 1 to 7% by weight, based on the total weight of the composition.

When the aqueous alcohol solution in the positive electrode slurry composition is included in this content range, the dispersibility of the positive electrode active material and/or the conductive material is highly improved, the surface roughness of the electrode is decreased, and a curling phenomenon in the electrode is remarkably reduced. In particular, when the electrode is curled during electrode manufacturing, cracks may occur on the electrode as the electrode is flattened in a process of manufacturing a battery, or the electrode may be detached from a current collector, which result in increased processing difficulties and costs. Therefore, improvements on these problems provide a great advantage in a manufacturing an electrode.

When the alcohol is included at a content of less than 0.1% by weight, it may be difficult to expect a desired effect as described above. On the other hand, when the content of the alcohol is greater than 10% by weight, solubility of the binder in the alcohol may be degraded, which make it difficult to prepare the slurry.

The positive electrode slurry composition may include 10 to 78% by weight of the positive electrode active material, 1 to 50% by weight of the binder, 0.1 to 10% by weight of the alcohol, and the balance of water, based on the total weight of the composition, but the present invention is not limited thereto.

Also, the composition may further include 0.1 to 10% by weight of a conductive material.

The positive electrode slurry composition of the present invention may include the alcohol at 2 to 45 parts by weight, more preferably 5 to 30 parts by weight, based on a total of 100 parts by weight of the positive electrode active material and the conductive material.

Also, the positive electrode slurry composition of the present invention may include 0.1 to 15% by weight of the alcohol and 85 to 99.9% by weight of the water, more preferably 0.5 to 10% by weight of the alcohol and 90 to 99.5% by weight of the water, and further preferably 1 to 7% by weight of the alcohol and 93 to 99% by weight of the water, based on the sum of weights of the alcohol and water.

When a content ratio of the alcohol included in the positive electrode slurry composition meets this content range, the dispersibility of the positive electrode active material and/or the conductive material may be highly improved, the surface roughness of the electrode may be decreased, and a curling phenomenon of the electrode may be remarkably reduced. In particular, when the electrode is curled during electrode manufacturing, cracks may occur on the electrode as the electrode is flattened in a process of manufacturing a battery, or the electrode may be detached from a current collector, which result in increased processing difficulties and costs. Therefore, improvements on these problems provide a great advantage in a manufacturing an electrode.

The positive electrode slurry composition of the present invention has a very excellent characteristic of highly improving the dispersibility of the positive electrode active material and/or the conductive material without using any dispersing agent.

The positive electrode slurry composition of the present invention may be preferably used to manufacture a positive electrode for lithium-sulfur batteries. In this case, a sulfur-carbon composite may be preferably used as the positive electrode active material.

Also, the present invention relates to a positive electrode manufactured by coating a current collector with the positive electrode slurry composition of the present invention.

Current collectors known in the related art may be used as the current collector, and the method of manufacturing a positive electrode may also be carried out according to methods known in the art.

The positive electrode of the present invention provides a very excellent effect for energy density of the electrode.

Further, the present invention relates to a battery, which includes:

the positive electrode of the present invention;
a negative electrode including a lithium metal or a lithium alloy as a negative electrode active material;
a separator provided between the positive electrode and the negative electrode; and
an electrolyte.

The battery may be a lithium-sulfur battery.

The aforementioned contents of the positive electrode are applicable as they are.

The negative electrode of the battery according to the present invention may be a negative electrode including a lithium metal or a lithium alloy as the negative electrode active material. In this case, negative electrodes known in the related art may be used as the negative electrode without any limitation.

An alloy of lithium with a metal selected from the group consisting of Na, K, Rb, Cs, Fr, Be, Mg, Ca, Sr, Ba, Ra, Al and Sn may be used as the lithium alloy serving as the negative electrode active material.

The separator disposed between the positive electrode and the negative electrode serves to separate or insulate the positive electrode and the negative electrode from each other and to enable the transfer of lithium ions between the positive electrode and the negative electrode, and may consist of a porous non-conductive or insulating material, but the present invention is not limited thereto. For example, separators known in the related art may be used herein.

The separator may be a separate member such as a film, and may also be a coating layer added to the positive electrode and/or the negative electrode. For example, the material constituting the separator includes polyolefins such as polyethylene and polypropylene, glass fiber filter papers, and ceramics, but the present invention is not limited thereto. In this case, the separator may have a thickness of approximately 5 µm to approximately 50 µm, particularly a thickness of approximately 5 µm to approximately 25 µm.

Electrolytes known in the related art may be used as the electrolyte. For example, a type of electrolyte including a lithium salt and an organic solvent may be used herein. The electrolyte may be configured so that the electrolyte is impregnated into the negative electrode, the positive electrode, and the separator.

A single solvent or a mixture of two or more organic solvents may, for example, be used as the organic solvent included in the electrolyte. When the mixture of two or more organic solvents is used, one or more solvent may be selected from two or more groups respectively of a group of weakly polar solvents, a group of strongly polar solvent, and a group of lithium metal-protecting solvents, and then used. The weakly polar solvent is defined as a solvent having a dielectric constant of less than 15, which is able to dissolve a sulfur element in an aryl compound, a bicyclic ether, or an acyclic carbonate, and the strongly polar solvent is defined as a solvent having a dielectric constant of greater than 15, which is able to dissolve a lithium polysulfide in a cyclic carbonate, a sulfoxide compound, a lactone compound, a ketone compound, an ester compound, a sulfate compound, or a sulfite compound, and the lithium metal-protecting solvent is defined as a solvent having a charging/discharging cycle efficiency of 50% or more, which forms a stable solid electrolyte interface (SEI) on a lithium metal such as a heterocyclic compound which includes N, O, S, or a combination thereof, a saturated ether compound, an unsaturated ether compound.

Specific examples of the weakly polar solvent include xylene, dimethoxyethane, 2-methyltetrahydrofuran, diethyl carbonate, dimethyl carbonate, toluene, dimethyl ether, diethyl ether, diglyme, tetraglyme, and the like, but the present invention is not limited thereto.

Specific examples of the strongly polar solvent include hexamethyl phosphoric triamide, γ-butyrolactone, acetonitrile, ethylene carbonate, propylene carbonate, N-methylpyrrolidone, 3-methyl-2-oxazolidone, dimethyl formamide, sulforane, dimethyl acetamide, dimethyl sulfoxide, dimethyl sulfate, ethylene glycol diacetate, dimethyl sulfite, ethylene glycol sulfite, and the like, but the present invention is not limited thereto.

Specific examples of the lithium metal-protecting solvent include tetrahydrofuran, ethylene oxide, dioxolane, 3,5-dimethylisoxazole, furan, 2-methyl furan, 1,4-oxane, 4-methyldioxolane, and the like, but the present invention is not limited thereto.

The battery may be configured by applying techniques known in the related art, excluding the features of the present invention as described above.

MODE FOR INVENTION

Hereinafter, preferred embodiments of the present invention are provided to aid in understanding the present invention. However, it should be appreciated by those skilled in the art that the detailed description disclosed herein is given by way of illustration of the present invention only, and thus various changes and modification may be made without departing from the spirit and scope of the present invention. Also, it will be apparent that such changes and modifications fall within the appended claims.

Example 1: Preparation of Slurry Composition for Manufacturing a Positive Electrode Sulfur (commercially available from Sigma-Aldrich) and carbon nanotubes (CNTs) were mixed, and heat-treated at 155° C. to prepare a sulfur-carbon composite. Vapor-grown carbon fibers (VGCFs) were used as the conductive material. A 3% aqueous solution in which two types of polyacrylic acids (commercially available from Sigma-Aldrich; molecular weights: 450,000 and 1,250,000; and mixed at a weight ratio of 5:2) were completely neutralized with lithium hydroxide (commercially available from Sigma-Aldrich) was used as the binder. The sulfur-carbon composite, the conductive material, and the binder solution as described above were mixed with an aqueous 1-propanol solution to prepare a slurry composition for manufacturing a positive electrode. The sulfur-carbon composite, the conductive material, and the binder in the slurry were present at a weight ratio of 88:5:7, and the solids and the solvent (1-propanol and water) were present at a weight ratio of 23:77. Also, a content of 1-propanol in the slurry was set to be 0.77% by weight.

Example 2: Preparation of Slurry Composition for Manufacturing a Positive Electrode A slurry composition for manufacturing a positive electrode was prepared in the same manner as in Example 1, except that a content of 1-propanol in the slurry used in Example 1 was set to be 3.85% by weight.

Example 3: Preparation of Slurry Composition for Manufacturing a Positive Electrode A slurry composition for manufacturing a positive electrode was prepared in the same manner as in Example 1, except that a content of 1-propanol in the slurry used in Example 1 was set to be 7.7% by weight.

Example 4: Preparation of Slurry Composition for Manufacturing a Positive Electrode A slurry composition for manufacturing a positive electrode was prepared in the same manner as in Example 1, except that ethanol was used instead of the 1-propanol in the slurry used in Example 1, and a content of the ethanol was set to be 3.85% by weight.

Comparative Example 1: Preparation of Slurry Composition for Manufacturing a Positive Electrode A slurry composition for manufacturing a positive electrode was prepared in the same manner as in Example 1, except that water was used instead of the aqueous 1-propanol solution used as the solvent in Example 1.

Comparative Example 2: Preparation of Slurry Composition for Manufacturing a Positive Electrode A dispersing agent (PVA poly vinyl alcohol) was further mixed with the sulfur-carbon composite, the conductive material, the binder used in Comparative Example 1 so that the respective components were present at a weight ratio of 87:5:7:1. Then, the solids and water were mixed at a weight ratio of 25:75 to prepare a slurry composition for manufacturing a positive electrode.

Comparative Example 3: Preparation of Slurry Composition for Manufacturing a Positive Electrode A slurry composition for manufacturing a positive electrode was prepared in the same manner as in Example 1, except that a content of 1-propanol in the slurry used in Example 1 was set to be 11.55% by weight. However, the slurry was unable to be prepared in a normal manner because the viscosity of the slurry increased to an extent to which the components were not mixed due to the degraded solubility of the binder.

Example 5: Manufacture of Positive Electrode

A positive electrode was manufactured by coating an aluminum current collector with the slurry composition prepared in Example 1 until an amount of the slurry composition reached 11.4 mg/cm$^2$.

Example 6: Manufacture of Positive Electrode

A positive electrode was manufactured by coating an aluminum current collector with the slurry composition prepared in Example 2 until an amount of the slurry composition reached 11.4 mg/cm$^2$.

Example 7: Manufacture of Positive Electrode

A positive electrode was manufactured by coating an aluminum current collector with the slurry composition prepared in Example 3 until an amount of the slurry composition reached 11.4 mg/cm$^2$.

Example 8: Manufacture of Positive Electrode

A positive electrode was manufactured by coating an aluminum current collector with the slurry composition prepared in Example 4 until an amount of the slurry composition reached 11.4 mg/cm$^2$.

Comparative Example 4: Manufacture of Positive Electrode

A positive electrode was manufactured by coating an aluminum current collector with the slurry composition prepared in Comparative Example 1 until an amount of the slurry composition reached 11.4 mg/cm$^2$.

Comparative Example 5: Manufacture of Positive Electrode

A positive electrode was manufactured by coating an aluminum current collector with the slurry composition prepared in Comparative Example 2 until an amount of the slurry composition reached 11.4 mg/cm$^2$.

Examples 9 to 12 and Comparative Example 6 to 7: Manufacture of Batteries

Each of the positive electrodes manufactured in Examples 5 and 8 and Comparative Examples 4 and 5; a lithium foil (as a negative electrode) having a thickness of approximately 45 μm; an electrolyte solution obtained by adding 1 M LiTFSI and 1% by weight of LiNO$_3$ to an ether-based solvent; and 20 μm-thick polyolefin (as a separator) were used to manufacture lithium-sulfur secondary batteries of Examples 9 to 12 and Comparative Examples 6 and 7. The details are listed in Table 1 below.

TABLE 1

| Batteries | Positive electrodes used |
| --- | --- |
| Example 9 | Positive electrode manufactured in Example 5 (manufactured using slurry of Example 1 (using 0.77% by weight of 1-propanol)) |
| Example 10 | Positive electrode manufactured in Example 6 (manufactured using slurry of Example 2 (using 3.85% by weight of 1-propanol)) |
| Example 11 | Positive electrode manufactured in Example 7 (manufactured using slurry of Example 3 (using 7.7% by weight of 1-propanol)) |
| Example 12 | Positive electrode manufactured in Example 8 (manufactured using slurry of Example 4 (using 3.85% by weight of ethanol)) |
| Comparative Example 6 | Positive electrode manufactured in Comparative Example 4 (manufactured using slurry of Comparative Example 1 (using only water as solvent)) |
| Comparative Example 7 | Positive electrode manufactured in Comparative Example 5 (manufactured using slurry of Comparative Example 2 (using water as solvent and dispersing agent)) |

Experimental Example 1: Evaluation of Physical Properties and Shapes of Electrodes Manufactured Using Slurry Compositions for Manufacturing a Positive Electrode The surface roughness values of the positive electrodes manufactured in Examples 5 to 8 and Comparative Examples 4 and 5 were measured, and shapes of the electrodes after drying were observed with the naked eye. The results are listed in Table 2 below.

TABLE 2

|  | Electrode of Comparative Example 4 | Electrode of Comparative Example 5 | Electrode of Example 5 | Electrode of Example 6 | Electrode of Example 7 | Electrode of Example 8 |
| --- | --- | --- | --- | --- | --- | --- |
| Weight ratio of alcohol | 0% (water) | 0% (water) | 1-propanol 0.77% | 1-propanol 3.85% | 1-propanol 7.7% | Ethanol 3.85% |
| Dispersing agent | X | ○ | X | X | X | X |
| Surface roughness of electrode | Sa: 4.924 Sz: 68.036 | Sa: 3.406 Sz: 53.201 | Sa: 4.642 Sz: 55.724 | Sa: 4.419 Sz: 57.762 | Sa: 4.652 Sz: 70.660 | Sa: 4.230 Sz: 54.632 |

As seen from Table 2, it was confirmed that the surface roughness values of the electrodes manufactured in Examples 5 to 8 of the present invention were identical to or remarkably improved over the electrode of Comparative Example 4 in which only water was used as the solvent.

Also, it was revealed that the curling of the electrodes manufactured in Examples 5 to 8 of the present invention after drying the electrodes was remarkably improved over the electrode of Comparative Example 4 in which only water was used as the solvent, and identical to or remarkably improved over the electrode of Comparative Example 5 in which the dispersing agent was used. Images of the electrodes after drying of Comparative Examples 4 and 5 and Examples 5 to 8 are shown in the FIGURE.

Further, the electrode of Comparative Example 4, in which only water was used as the solvent, had problems in that cracks occurred on the electrode as the curled electrode was flattened, and the electrode was detached. However, the cracks and detachment did not occur in the case of the electrodes of Examples 5 to 8 of the present invention.

Experimental Example 2: Evaluation of Energy Densities of Batteries

The energy densities of the batteries manufactured in Examples 9 to 12 and Comparative Example 7 were measured according to the following method.

<Analysis Conditions>

Equipment: 100 mA-grade charger/discharger

Discharging: 0.1 C, constant current mode, discharging completed when reaching a voltage of 1.8 V Temperature: 25° C.

The energy density was calculated by dividing the energy of the battery measured after the discharge by the weight of the positive electrode (excluding the current collector), and the three identical batteries were manufactured for each condition. In this case, the results are expressed as average values.

TABLE 3

| Test Battery | Conditions | Energy Density (Wh/kg) |
| --- | --- | --- |
| Example 9 | 0.77% 1-Propanol (Examples 1 and 5) | 1,416 |
| Example 10 | 3.85% 1-Propanol (Examples 2 and 6) | 1,381 |
| Example 11 | 7.7% 1-Propanol (Examples 3 and 7) | 1,429 |

TABLE 3-continued

| Test Battery | Conditions | Energy Density (Wh/kg) |
| --- | --- | --- |
| Example 12 | 3.85% Ethanol (Examples 4 and 8) | 1,426 |
| Comparative Example 7 | Water, Dispersing Agent (Comparative Examples 2 and 5) | 1,348 |

As can be seen from Table 3, it was revealed that, even when no additional dispersing agent was used, the batteries manufactured in Examples 9 to 12 of the present invention showed superior energy density, compared to the battery of Comparative Example 7 in which the dispersing agent was used.

The invention claimed is:

1. A positive electrode slurry composition comprising:
a positive electrode active material;
a binder;
a conductive material; and
a solvent consisting of a C1 to C5 alcohol and water,
wherein the composition comprises 10 to 78% by weight of the positive electrode active material, 1 to 50% by weight of the binder, and 0.1 to 10% by weight of the conductive material;
wherein the solvent consists of a content of the alcohol in a range of 0.1 to 10% by weight, with the balance being water, based on a total weight of the composition,
wherein the positive electrode active material is a S—C composite;
wherein the binder is a lithiated polyacrylic acid;
wherein the conductive material comprises vapor-grown carbon fibers (VGCFs);
wherein the C1 to C5 alcohol is 1-propanol; and
wherein the composition is suitable for use in manufacturing a positive electrode for lithium-sulfur batteries.

2. The positive electrode slurry composition of claim 1, wherein the solvent consists of 1 to 7% by weight of the alcohol and 93 to 99% by weight of water, based on a sum of weights of the alcohol and water.

3. The positive electrode slurry composition of claim 1, wherein the composition comprises 2 to 45 parts by weight of the alcohol, based on a total of 100 parts by weight of the positive electrode active material and the conductive material.

\* \* \* \* \*